United States Patent
Graunke

(10) Patent No.: US 8,639,915 B2
(45) Date of Patent: *Jan. 28, 2014

(54) APPARATUS AND METHOD FOR DISTRIBUTING PRIVATE KEYS TO AN ENTITY WITH MINIMAL SECRET, UNIQUE INFORMATION

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/750,128

(22) Filed: Mar. 30, 2010

(65) Prior Publication Data

US 2010/0183154 A1  Jul. 22, 2010

Related U.S. Application Data

(63) Continuation of application No. 10/782,572, filed on Feb. 18, 2004, now Pat. No. 7,802,085.

(51) Int. Cl.
*G06F 15/177* (2006.01)
(52) U.S. Cl.
USPC ....... 713/1; 713/2; 713/194; 726/34; 380/279
(58) Field of Classification Search
USPC ...................... 713/1, 2, 194; 726/34; 380/279
See application file for complete search history.

(56) References Cited

U.S. PATENT DOCUMENTS

| 3,699,532 | A | 10/1972 | Schaffer et al. |
| 3,996,449 | A | 12/1976 | Attanasio et al. |
| 4,037,214 | A | 7/1977 | Birney et al. |
| 4,162,536 | A | 7/1979 | Morley |
| 4,207,609 | A | 6/1980 | Luiz et al. |
| 4,247,905 | A | 1/1981 | Yoshida et al. |
| 4,276,594 | A | 6/1981 | Morley |
| 4,278,837 | A | 7/1981 | Best |
| 4,307,447 | A | 12/1981 | Provanzano et al. |

(Continued)

FOREIGN PATENT DOCUMENTS

| CN | 1985466 | 6/2007 |
| CN | 101019368 | 8/2007 |

(Continued)

OTHER PUBLICATIONS

Menezes et al., Handbook of Applied Cryptography, CRC Press, Oct. 1996, pp. 32-33.*

(Continued)

*Primary Examiner* — Eleni Shiferaw
*Assistant Examiner* — Paul Callahan
(74) *Attorney, Agent, or Firm* — Blakely, Sokoloff, Taylor & Zafman LLP

(57) ABSTRACT

In some embodiments, a method and apparatus for distributing private keys to an entity with minimal secret, unique information are described. In one embodiment, the method includes the storage of a chip secret key within a manufactured chip. Once the chip secret key is stored or programmed within the chip, the chip is sent to a system original equipment manufacturer (OEM) in order to integrate the chip within a system or device. Subsequently, a private key is generated for the chip by a key distribution facility (KDF) according to a key request received from the system OEM. In one embodiment, the KDF is the chip manufacturer. Other embodiments are described and claimed.

20 Claims, 12 Drawing Sheets

COMPUTER SYSTEM 100

(56) References Cited

U.S. PATENT DOCUMENTS

| | | |
|---|---|---|
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,529,870 A | 7/1985 | Chaum |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,843,541 A | 6/1989 | Bean et al. |
| 4,907,270 A | 3/1990 | Hazard |
| 4,907,272 A | 3/1990 | Hazard |
| 4,910,774 A | 3/1990 | Barakat |
| 4,974,159 A | 11/1990 | Hargrove et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,515,441 A | 5/1996 | Faucher |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,631,961 A | 5/1997 | Mills et al. |
| 5,633,929 A | 5/1997 | Kaliski, Jr. |
| 5,657,445 A | 8/1997 | Pearce |
| 5,668,971 A | 9/1997 | Neufeld |
| 5,680,547 A | 10/1997 | Chang |
| 5,684,948 A | 11/1997 | Johnson et al. |
| 5,699,431 A | 12/1997 | Van Oorschot et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,724,425 A | 3/1998 | Chang et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,918 A | 5/1998 | Hopkins |
| 5,757,919 A | 5/1998 | Herbert et al. |
| 5,764,969 A | 6/1998 | Kahle |
| 5,771,291 A | 6/1998 | Newton et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,815,665 A | 9/1998 | Teper et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,857,021 A | 1/1999 | Kataoka et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,924,094 A | 7/1999 | Sutter |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,032,260 A | 2/2000 | Sasmazel et al. |
| 6,032,261 A | 2/2000 | Hulyalkar |
| 6,035,374 A | 3/2000 | Panwar et al. |
| 6,036,061 A | 3/2000 | O'Donnell |
| 6,036,601 A | 3/2000 | Heckel |
| 6,038,322 A | 3/2000 | Harkins |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,073,237 A * | 6/2000 | Ellison ........................ 713/171 |
| 6,075,938 A | 6/2000 | Bugnion et al. |
| 6,078,667 A | 6/2000 | Johnson |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,138,239 A | 10/2000 | Veil |
| 6,148,379 A | 11/2000 | Schimmel |
| 6,151,676 A | 11/2000 | Cuccia et al. |
| 6,154,841 A | 11/2000 | Oishi |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,185,316 B1 | 2/2001 | Buffam |
| 6,188,257 B1 | 2/2001 | Buer |
| 6,192,455 B1 | 2/2001 | Bogin et al. |
| 6,199,152 B1 | 3/2001 | Kelly et al. |

(56) References Cited

U.S. PATENT DOCUMENTS

| | | |
|---|---|---|
| 6,205,550 B1 | 3/2001 | Nardone et al. |
| 6,212,635 B1 | 4/2001 | Reardon |
| 6,222,923 B1 | 4/2001 | Schwenk |
| 6,246,771 B1 | 6/2001 | Stanton et al. |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,278,782 B1 | 8/2001 | Ober et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,403 B1 | 5/2002 | Dorak, Jr. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,411,715 B1 | 6/2002 | Liskov et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough |
| 6,463,535 B1 | 10/2002 | Drews et al. |
| 6,463,537 B1 | 10/2002 | Tello |
| 6,473,508 B1 | 10/2002 | Young et al. |
| 6,473,800 B1 | 10/2002 | Jerger et al. |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,711,263 B1 | 3/2004 | Nordenstam et al. |
| 6,738,904 B2 | 5/2004 | Linnartz et al. |
| 6,792,113 B1 | 9/2004 | Ansell et al. |
| 6,826,616 B2 | 11/2004 | Larson et al. |
| 6,987,853 B2 | 1/2006 | Uner |
| 6,988,250 B1 | 1/2006 | Proudler et al. |
| 7,028,149 B2 | 4/2006 | Grawrock et al. |
| 7,133,990 B2 | 11/2006 | Link et al. |
| 7,165,181 B2 | 1/2007 | Brickell |
| 7,178,030 B2 | 2/2007 | Scheidt et al. |
| 7,181,620 B1 | 2/2007 | Hur |
| 7,216,110 B1 | 5/2007 | Ogg et al. |
| 7,233,666 B2 | 6/2007 | Lee et al. |
| 7,299,500 B1 | 11/2007 | Klebe et al. |
| 7,339,400 B1* | 3/2008 | Walstrum et al. ............. 326/41 |
| 7,526,651 B2 | 4/2009 | Arditti Modiano et al. |
| 7,802,085 B2* | 9/2010 | Graunke ............. 713/2 |
| 2001/0011267 A1 | 8/2001 | Kihara et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2001/0044786 A1 | 11/2001 | Ishibashi |
| 2001/0044886 A1 | 11/2001 | Cassagnol et al. |
| 2002/0004900 A1 | 1/2002 | Patel |
| 2002/0007456 A1 | 1/2002 | Peinado et al. |
| 2002/0012432 A1 | 1/2002 | England et al. |
| 2002/0023032 A1 | 2/2002 | Pearson et al. |
| 2002/0044567 A1 | 4/2002 | Voit et al. |
| 2002/0048369 A1 | 4/2002 | Ginter et al. |
| 2002/0065136 A1 | 5/2002 | Day |
| 2002/0080190 A1 | 6/2002 | Hamann et al. |
| 2002/0120844 A1* | 8/2002 | Faccin et al. ............. 713/168 |
| 2002/0147916 A1 | 10/2002 | Strongin et al. |
| 2002/0166053 A1 | 11/2002 | Wilson |
| 2002/0166061 A1 | 11/2002 | Falik et al. |
| 2002/0169717 A1 | 11/2002 | Challener |
| 2002/0169966 A1* | 11/2002 | Nyman et al. ............. 713/182 |
| 2002/0178354 A1 | 11/2002 | Ogg et al. |
| 2002/0178534 A1 | 12/2002 | Massaro |
| 2002/0198302 A1 | 12/2002 | Rouse et al. |
| 2003/0002668 A1 | 1/2003 | Graunke et al. |
| 2003/0018892 A1 | 1/2003 | Tello |
| 2003/0037237 A1 | 2/2003 | Abgrall et al. |
| 2003/0041250 A1 | 2/2003 | Proudler |
| 2003/0074548 A1 | 4/2003 | Cromer et al. |
| 2003/0105718 A1 | 6/2003 | Hurtado et al. |
| 2003/0112008 A1 | 6/2003 | Hennig |
| 2003/0114144 A1 | 6/2003 | Minemura |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0182584 A1 | 9/2003 | Banes et al. |
| 2003/0188156 A1 | 10/2003 | Yasala et al. |
| 2003/0188179 A1 | 10/2003 | Challener et al. |
| 2003/0188181 A1 | 10/2003 | Kunitz et al. |
| 2003/0195857 A1 | 10/2003 | Acquisti |
| 2003/0196085 A1 | 10/2003 | Lampson et al. |
| 2003/0231328 A1 | 12/2003 | Chapin et al. |
| 2003/0235175 A1 | 12/2003 | Naghian et al. |
| 2004/0003324 A1 | 1/2004 | Uhlig et al. |
| 2004/0039924 A1 | 2/2004 | Baldwin et al. |
| 2004/0064694 A1 | 4/2004 | Lee et al. |
| 2004/0103281 A1 | 5/2004 | Brickell |
| 2004/0107286 A1 | 6/2004 | Larson et al. |
| 2004/0117539 A1 | 6/2004 | Bennett et al. |
| 2004/0123288 A1 | 6/2004 | Bennett et al. |
| 2004/0240667 A1 | 12/2004 | Lee et al. |
| 2004/0260926 A1 | 12/2004 | Arditti Modiano et al. |
| 2005/0010535 A1 | 1/2005 | Camenisch |
| 2005/0081038 A1 | 4/2005 | Arditti Modiano et al. |
| 2005/0100161 A1 | 5/2005 | Husemann et al. |
| 2005/0114682 A1 | 5/2005 | Zimmer et al. |
| 2005/0154890 A1 | 7/2005 | Vembu |
| 2005/0283586 A1 | 12/2005 | Mondal et al. |
| 2006/0013399 A1 | 1/2006 | Brickell et al. |
| 2006/0013400 A1 | 1/2006 | Sutton et al. |
| 2006/0013402 A1 | 1/2006 | Sutton et al. |
| 2006/0020786 A1 | 1/2006 | Helms et al. |
| 2006/0117181 A1 | 6/2006 | Brickell |
| 2007/0100913 A1 | 5/2007 | Sumner et al. |
| 2007/0192829 A1 | 8/2007 | Ford |

FOREIGN PATENT DOCUMENTS

| | | |
|---|---|---|
| CN | 101019369 | 8/2007 |
| DE | 4217444 | 12/1992 |
| DE | 10218835 A1 | 4/2002 |
| DE | 112005001666 T5 | 5/2007 |
| DE | 112005001672 T | 5/2007 |
| DE | 112005001654 T5 | 11/2007 |
| EP | 0473913 | 3/1992 |
| EP | 0492692 | 7/1992 |
| EP | 0600112 | 6/1994 |
| EP | 0602867 | 6/1994 |
| EP | 0877314 | 11/1998 |

(56) References Cited

FOREIGN PATENT DOCUMENTS

| | | |
|---|---|---|
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1067470 | 1/2001 |
| EP | 1085396 | 3/2001 |
| EP | 1146715 | 10/2001 |
| EP | 1209563 | 5/2002 |
| EP | 1271277 | 1/2003 |
| EP | 1617587 A1 | 1/2006 |
| FR | 2620248 | 3/1989 |
| FR | 2700430 | 7/1994 |
| FR | 2714780 | 7/1995 |
| FR | 2742618 | 6/1997 |
| FR | 2752122 | 2/1998 |
| FR | 2763452 | 11/1998 |
| FR | 2830147 | 3/2003 |
| GB | 2439160 | 12/2007 |
| JP | 2000076139 | 3/2000 |
| JP | 2006293472 | 10/2006 |
| WO | WO-9524696 | 9/1995 |
| WO | WO-9729567 | 8/1997 |
| WO | WO-9812620 | 3/1998 |
| WO | WO-9834365 | 8/1998 |
| WO | WO-9844402 | 10/1998 |
| WO | WO-9905600 | 2/1999 |
| WO | WO-9909482 | 2/1999 |
| WO | WO-9918511 | 4/1999 |
| WO | WO-9931842 | 6/1999 |
| WO | WO-9957863 | 11/1999 |
| WO | WO-9965579 | 12/1999 |
| WO | WO-0021238 | 4/2000 |
| WO | WO-0049764 | 8/2000 |
| WO | WO-0062232 | 10/2000 |
| WO | WO-0069206 | 11/2000 |
| WO | WO-0127723 | 4/2001 |
| WO | WO-0127821 | 4/2001 |
| WO | WO-0143476 | 6/2001 |
| WO | WO-0163954 | 8/2001 |
| WO | WO-0163994 | 8/2001 |
| WO | WO-0175565 | 10/2001 |
| WO | WO-0175595 | 10/2001 |
| WO | WO-0201794 | 1/2002 |
| WO | WO-0217555 | 2/2002 |
| WO | WO-0163953 | 6/2002 |
| WO | WO-0245453 | 6/2002 |
| WO | WO-02060121 | 8/2002 |
| WO | WO-02073928 | 9/2002 |
| WO | WO-0175564 | 10/2002 |
| WO | WO-02086684 | 10/2002 |
| WO | WO-03058412 | 7/2003 |
| WO | WO2005064881 * 12/2003 .............. H04L 29/06 | |
| WO | WO-2006019614 | 2/2006 |
| WO | WO-2006023151 | 3/2006 |
| WO | WO-2006025952 | 3/2006 |

OTHER PUBLICATIONS

Notice of Allowance as received in U.S. Appl. No. 10/892,265 mailed May 13, 2010.
Final Office Action as received in U.S. Appl. No. 10/892,265 mailed Apr. 17, 2008.
Non-Final Office Action as received in U.S. Appl. No. 10/892,265 mailed Nov. 25, 2008.
Non-Final Office Action as received in U.S. Appl. No. 10/892,265 mailed Sep. 12, 2007.
Non-Final Office Action as received in U.S. Appl. No. 10/892,265 mailed Jun. 15, 2009.
Non-Final Office Action as received in U.S. Appl. No. 10/892,265 mailed Jan. 22, 2010.
Final Office Action as received in U.S. Appl. No. 10/782,572 mailed Jul. 9, 2008.
Non-Final Office Action as received in U.S. Appl. No. 10/782,572 mailed Dec. 31, 2007.
Non-Final Office Action as received in U.S. Appl. No. 10/782,572 mailed Dec. 23, 2008.
Non-Final Office Action as received in U.S. Appl. No. 10/782,572 mailed Jul. 22, 2009.
Notice of Allowance as received in U.S. Appl. No. 10/782,572 mailed May 17, 2010.
Non-Final Office Action as received in U.S. Appl. No. 10/866,252 mailed Oct. 29, 2004.
Final Office Action as received in U.S. Appl. No. 10/866,252 mailed May 5, 2005.
Notice of Allowance as received in U.S. Appl. No. 10/866,252 mailed Sep. 11, 2008.
Non-Final Office Action as received in U.S. Appl. No. 10/866,252 mailed Aug. 19, 2005.
Final Office Action as received in U.S. Appl. No. 10/866,252 mailed Jan. 20, 2006.
Non-Final Office Action as received in U.S. Appl. No. 10/866,252 mailed Apr. 5, 2007.
Final Office Action as received in U.S. Appl. No. 10/866,252 mailed Jul. 16, 2007.
Non-Final Office Action as received in U.S. Appl. No. 10/866,252 mailed Dec. 10, 2007.
PCT, International Search Report and Written Opinion of the International Searching Authority, Application No. PCT/US2005/024486, mailed Sep. 18, 2006.
Ateniese, Giuseppe, et al., "A Practical and Provably Secure Coalition-Resistant Group Signature Scheme", *Advances in Cryptology—CRYPTO2000*, vol. 1880 of *Lecture Notes in Computer Science*, Int'l; Assoc for Crypt Res, Spring-Verlag, Berlin, Germany, (2000), 16 pages.
Berg, Cliff, "How Do I Create a Signed Applet?", *Dr. Dobb's Journal*, (Aug. 1997), 6 pages.
Brands, Stefan, "Restrictive Blinding of Secret-Key Certificates", *Springer-Verlag* XP002201306, (1995), Chapter 3, 38 pages.
Chang, T.-W., "Efficient Authentication Schemes Based on Group Certificate and Their Application on Mobile Communication Systems", *Thesis for Master of Science, Department of Electrical Engineering, National Cheng Kung University*, Tainan, Taiwan, (Jun. 2003), 42 pages.
Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999), 209-221.
Compaq Computer Corporation, "Trusted Computing Platform Alliance (TCPA) Main Specification Version 1.1a", XP002272822, (Jan. 25, 2001), 1-321.
Coulouris, George, et al., "Distributed Systems, Concepts and Designs", *2nd Edition* (1994), 422-424.
Crawford, John, "Architecture of the Intel 80386", *Proceedings of the IEEE International Conference on Computer Design: VLSI in Computers and Processors (ICCD '86)*, (Oct. 6, 1986), 155-160.
Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989), pp. 312-318.
Fabry, R.S., "Capability-Based Addressing", Fabry, R.S., "*Capability-Based Adressing,*" *Communications of the ACM*, vol. 17, No. 7, (Jul. 1974), 403-412.
Frieder, Gideon, "The Architecture and Operational Characteristics of the VMX Host Machine", *The Architecture and Operational Characteristics of the VMX Host Machine, IEEE*, (1982), 9-16.
Goldberg, Robert P., "Survey of Virtual Machine Research", *Computer Magazine*, (Jun. 1974), 34-45.
Gong, Li, et al., "Going Beyond the Sandbox: An Overview of the New Security Architecture in the Java Development Kit 1.2", *Proceedings of the USENIX Symposium on Internet Technologies and Systems*, Monterey, CA, (Dec. 1997) 11 pages.
Gum. P. H., "System/370 Extended Architecture: Facilities for Virtual Machines", *IBM J. Research Development*, vol. 27, No. 6, (Nov. 1983), 530-544.

(56) References Cited

OTHER PUBLICATIONS

Hall, Judith S., et al., "Virtualizing the VAX Architecture", *ACM SIGARCH Computer Architecture News, Proceedings of the 18th Annual International Symposium on Computer Architecture*, vol. 19, Issue No. 3, (Apr. 1991), 10 pages.

Hawthorne, W. M., "An Alternative to Public Key Encryption", *European Convention on Security and Detection*, Found at: http://ieeexplore.ieee.org/stamp/stamp.jsp?tp=&arnumber=491615&isnumber=10615, (May 1995), 142-145.

Heinrich, Joe, "MIPS R4000 Microprocessor User's Manual, Second Edition", *Chapter 4 "Memory Management"*, (Jun. 11, 1993), 61-97.

HP Mobile Security Overview, "HP Mobile Security Overview", (Sep. 2002), 10 pages.

IBM, "Information Display Technique for a Terminate Stay Resident Program IBM Technical Disclosure Bulletin", TDB-ACC-No. NA9112156. vol. 34, Issue 7A, (Dec. 1, 1991), 156-158, 4 pages.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004, (Jul. 2, 2002), 6 pages.

Intel Corporation, "IA-32 Intel Architecture Software Developer's Manual", vol. 3: *System Programming Guide*, Intel Corporation—2003, 13-1 through 13-24, 43 pages.

Intel Corporation, "IA-64 System Abstraction Layer Specification", *Intel Product Specification*, Order No. 245359-001, (Jan. 2000), 47 pages.

Intel Corporation, "Intel 82802AB/82802AC Firmware Hub (FWH)", *Intel Product Datasheet*, Document No. 290658-004, (Nov. 2000), 1-6, 17-28. 18 pages.

Intel Corporation, "Intel IA-64 Architecture Software Developer's Manual", vol. 2: *IA-64 System Architecture*, Order No. 245318-001. (Jan. 2000), i, ii, 5.1-5.3, 11.1-11.8, 11.23-11.26, 17 pages.

Intel Corporation, "Intel386 DX Microprocessor 32-Bit CHMOS Microprocessor With Integrated Memory Management", (1995), 5-56, 56 pages.

Karger, Paul A., et al., "A VMM Security Kernel for the VAX Architecture", *Proceedings of the Symposium on Research in Security and Privacy*, XP010020182, ISBN 0-8186-2060-9, Boxborough, MA, (May 7, 1990), 2-19, 18 pages.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Computer Soc., US, ISBN 0-8186-7638-8, (1996), 10 pages.

Lawton, Kevin, et al., "Running Multiple Operating Systems Concurrently on an IA32 PC Using Virtualization Techniques", http://www.plex86.org/research/paper.txt, (Nov. 29, 1999), 1-31.

Luke, Jahn, et al., "Replacement Strategy for Aging Avionics Computers", *IEEE AES Systems Magazine*, XP002190614, (Mar. 1999).

Menezes, Alfred J., et al., "Handbook of Applied Cryptography", *CRC Press Series on Discrete Mathematics and its Applications*, Boca Raton, FL, XP002165287, ISBN 0849385237, (Oct. 1996), 403-405, 506-515, 570, 14 pages.

Menezes, et al., "Hash Functions and Date Integrity", *PRC Press, LLC*, (1997), Chapter 9, 63 pages.

Motorola, "M68040 User's Manual", (1993), 96 pages.

Nanba, S., et al., "VM/4: ACOS-4 Virtual Machine Architecture", *VM/4: ACOS-4 Virtual Machine Architecture, IEEE*, (1985), 171-178.

Richt, Stefan, et al., "In-Circuit-Emulator Wird Echtzeittauglich", *Elektronic, Franzis Verlag GMBH*, Munchen, DE, vol. 40, No. 16, XP000259620, (Aug. 6, 1991), 100-103.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-17, 18 pages.

Rosenberg, Jonathan B., "How Debuggers Work (Algorithms, Data Structures, and Architecture", *Chapters 3 and 5 Hardware Debugger Facilities, Wiley Computer Publishing*, United States, (1996), pp. 42-43, 95, 96 and 99, 27 pages.

Rosenblum, M., "Virtual Platform: A Virtual Machine Monitor for Commodity PC", *Proceedings of the 11th Hotchips Conference*, (Aug. 17, 1999), 185-196, 18 pages.

RSA Security, "Hardware Authenticators", www.rsasecurity.com/node.asp?id=1158, pp. 1-2.

RSA Security, "RSA SecurID Authenticators", www.rsasecurity.com/products/securid/datasheets/SID_DS_0103.pdf, pp. 1-2.

RSA Security, "Software Authenticators", www.srasecurity.com/node.asp?id=1313, pp. 1-2.

Saez, Sergio, et al., "A Hardware Scheduler for Complex Real-Time Systems", *Proceedings of the IEEE International Symposium on Industrial Electronics*, XP002190615, (Jul. 1999), 43-48, 6 pages.

Schneier, Bruce, "Applied Cryptography", *Wiley and Sons*, (1996), p. 173, 6 pages.

Schneier, Bruce, "Applied Cryptography: Protocols, Algorithm, and Source Code in C", *Wiley, John & Sons, Inc.*, XP002939871; ISBN 0471117099, (Oct. 1995), 47-52.

Schneier, Bruce, "Applied Cryptography: Protocols, Algorithm, and Source Code in C", *Wiley, John & Sons, Inc.*, XP002138607; ISBN 0471117099, (Oct. 1995), 56-65.

Schneier, Bruce, "Applied Cryptography: Protocols, Algorithms, and Source Code C", *Wiley, John & Sons, Inc.*, XP0021111449; ISBN 0471117099, (Oct. 1995), 169-187.

Sherwood, Timothy, et al., "Patchable Instruction ROM Architecture", *Department of Computer Science and Engineering*, University of California, San Diego, La Jolla, CA, (Nov. 2001), 20 pages.

Non-Final Office Action (dated Jun. 2, 2009), U.S. Appl. No. 11/387,203, filed Mar. 22, 2006, First Named Inventor: Ernest Brickell.

Final Office Action (dated Dec. 7, 2009), U.S. Appl. No. 11/387,203, filed Mar. 22, 2006, First Named Inventor: Ernest Brickell.

Non-Final Office Action (dated Mar. 29, 2010), U.S. Appl. No. 11/387,203, filed Mar. 22, 2006, First Named Inventor: Ernest Brickell.

Final Office Action (dated Feb. 1, 2011), U.S. Appl. No. 11/387,203, filed Mar. 22, 2006, First Named Inventor: Ernest Brickell.

U.S. Patent and Trademark Office Official Action for related U.S. Appl. No. 10/892,280 mailed Nov. 26, 2008.

PCT, Preliminary Report on Patentability (Chapter 1 of the Patent Cooperation Treaty), Application No. PCT/US2005/024486 mailed Jan. 25, 2007.

PCT, International Search Report and Written Opinion of the International Searching Authority, Application No. PCT/US2005/024374 mailed Sep. 18, 2006.

PCT, Preliminary Report on Patentability (Chapter 1 of the Patent Cooperation Treaty), Application No. PCT/US2005/024374, mailed Jan. 25, 2007.

PCT, International Search Report and Written Opinion of the International Searching Authority, Application No. PCT/US2005/024251, mailed Oct. 6, 2005.

PCT, Preliminary Report on Patentability (Chapter 1 of the Patent Cooperation Treaty), Application No. PCT/US2005/024251, mailed May 5, 2011.

PCT, International Search Report and Written Opinion of the International Searching Authority, Application No. PCT/US2005/024253, mailed Sep. 18, 2006.

PCT, Preliminary Report on Patentability (Chapter 1 of the Patent Cooperation Treaty), Application No. PCT/US2005/024253, mailed Jan. 25, 2007.

U.S. Patent and Trademark Office, Office Action dated Jun. 15, 2009, with Reply to Office Action filed on Sep. 15, 2009, in related U.S. Appl. No. 10/892,265.

International Application No. PCT/US2005/024253, International Search Report.

Non-Final Office Action (dated Jul. 21, 2010), U.S. Appl. No. 11/387,203, filed Mar. 22, 2006, First Named Inventor: Ernest Brickell.

Notice of Allowance (dated Apr. 29, 2011), U.S. Appl. No. 11/387,203, filed Mar. 22, 2006, First Named Inventor: Ernest Brickell.

Final Office Action (dated Dec. 23, 2009), U.S. Appl. No. 10/999,576, filed Nov. 30, 2001 First Named Inventor: Ernest Brickell.

(56) References Cited

OTHER PUBLICATIONS

Non-Office Action (dated Jan. 24, 2008), U.S. Appl. No. 10/999,576, filed Nov. 30, 2001 First Named Inventor: Ernest Brickell.
Non-Final Office Action (dated Jul. 24, 2008), U.S. Appl. No. 10/999,576, filed Nov. 30, 2001 First Named Inventor: Ernest Brickell.
Final Office Action (dated Jan. 6, 2009), U.S. Appl. No. 10/999,576, filed Nov. 30, 2001 First Named Inventor: Ernest Brickell.
Non-Final Office Action (dated Jun. 9, 2009), U.S. Appl. No. 10/999,576, filed Nov. 30, 2001 First Named Inventor: Ernest Brickell.
Non-Final Office Action (dated Jul. 23, 2007), U.S. Appl. No. 10/892,256, filed Jul. 14, 2004 First Named Inventor: James A. Sutton II.
Final Office Action (dated Apr. 1, 2008), U.S. Appl. No. 10/892,256, filed Jul. 14, 2004 First Named Inventor: James A. Sutton II.
Non-Final Office Action (dated Sep. 29, 2008), U.S. Appl. No. 10/892,256, filed Jul. 14, 2004 First Named Inventor: James A. Sutton II.
Final Office Action (dated Mar. 24, 2009), U.S. Appl. No. 10/892,256, filed Jul. 14, 2004 First Named Inventor: James A. Sutton II.
Notice of Allowance (dated Dec. 7, 2009), U.S. Appl. No. 10/892,256, filed Jul. 14, 2004 First Named Inventor: James A. Sutton II.
Non-Final Office Action (dated Jul. 9, 2009), U.S. Appl. No. 10/892,280, filed Jul. 14, 2004 First Named Inventor: James A. Sutton II.
Non-Final Office Action (dated Sep. 12, 2007), U.S. Appl. No. 10/892,280, filed Jul. 14, 2004 First Named Inventor: James A. Sutton II.
Final Office Action (dated May 14, 2008), U.S. Appl. No. 10/892,280, filed Jul. 14, 2004 First Named Inventor: James A. Sutton II.

* cited by examiner

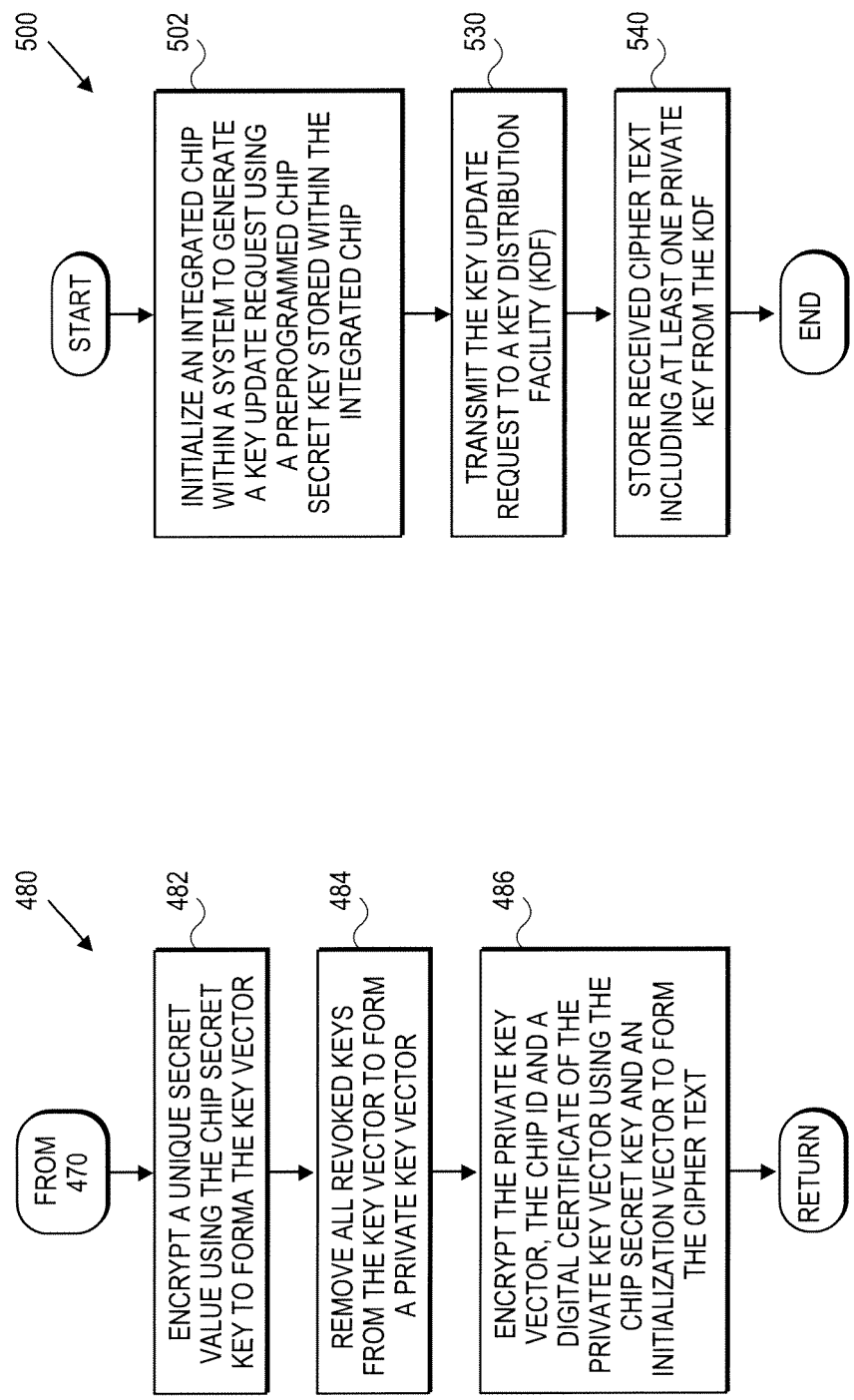

APPARATUS AND METHOD FOR DISTRIBUTING PRIVATE KEYS TO AN ENTITY WITH MINIMAL SECRET, UNIQUE INFORMATION

CROSS REFERENCE TO RELATED APPLICATIONS

This application is a continuation of U.S. patent application Ser. No. 10/782,572 filed on Feb. 18, 2004, now U.S. Pat. No. 7,802,085.

FIELD OF THE INVENTION

One or more embodiments of the invention relate generally to the field of cryptography. More particularly, one or more of the embodiments of the invention relates to a method and apparatus for distributing private keys to an entity with minimal secret, unique information.

BACKGROUND OF THE INVENTION

The proliferation of the Internet has led to the creation of a new form of commerce, generally referred to as Internet or electronic commerce (E-commerce). E-commerce enables users to sell and purchase items from a worldwide community connected via the Internet. This added simplicity, coupled with the continually reduced costs and increasing processing speed of modern-day computers, has led to the inclusion of a personal computer (PC) in many homes throughout the world. Unfortunately, the proliferation of PCs within the homes throughout the world, as well as the use of such PCs for E-commerce, often results in the storage of sensitive information within a computer.

As a result, computer users become susceptible to rogue agents, which may desire to gain access to secure information loaded within their personal computer. In order to combat the various rogue agents from gaining access to the secure information, many computer systems employ some form of cryptographs in order to prevent access to sensitive information. As known to those skilled in the art, cryptography provides a technique for keeping information secret, for determining that the information has not been tampered with and for determining who authored pieces of information.

One form of cryptography involves public/private key systems. Public/private key systems encrypt information prior to transmission using a public key and decrypting received encrypted information using a private key that is only known to the recipient of the encrypted information. However, once the sensitive information arrives at its designated location, the information is often decrypted and stored in a clear format. In other words, the sensitive information is not maintained in a secure format at its destination. As a result, during operation of a PC, a rogue agent could possibly gain access to the PC and gain access to sensitive information.

Furthermore, the proliferation of E-commerce has led to the availability of media applications, such as motion pictures and music, which may be downloaded to a PC for one-time use or for use for a predetermined period of time. Unfortunately, without some mechanism for protecting the contents of such media applications from access by rogue agents, E-commerce involving media applications may be prohibitive to the media providers. As a result, media or content providers may be reluctant to create high quality media or content providing applications when such content may be susceptible to rogue agents.

BRIEF DESCRIPTION OF THE DRAWINGS

The various embodiments of the present invention are illustrated by way of example, and not by way of limitation, in the figures of the accompanying drawings and in which:

FIG. 10 is a flowchart illustrating a method for generating a key vector, in accordance with one embodiment.

FIG. 11 is a flowchart illustrating a method for initializing an integrated chip, including stored secret, unique information, to receive at least one private key, in accordance with one embodiment.

DETAILED DESCRIPTION

A method and apparatus for distributing private keys to an entity with minimal secret, unique information are described. In one embodiment, the method includes the storage of a chip secret key within a manufactured chip. Once the chip secret key is stored or programmed within the chip, the chip is sent to a system original equipment manufacturer (OEM) in order to integrate the chip within a system or device. Subsequently, a private key is generated for the chip by a key distribution facility (KDF) according to a key request received from the system OEM. In one embodiment, the KDF is the chip manufacturer.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like.

System

Figure 1:
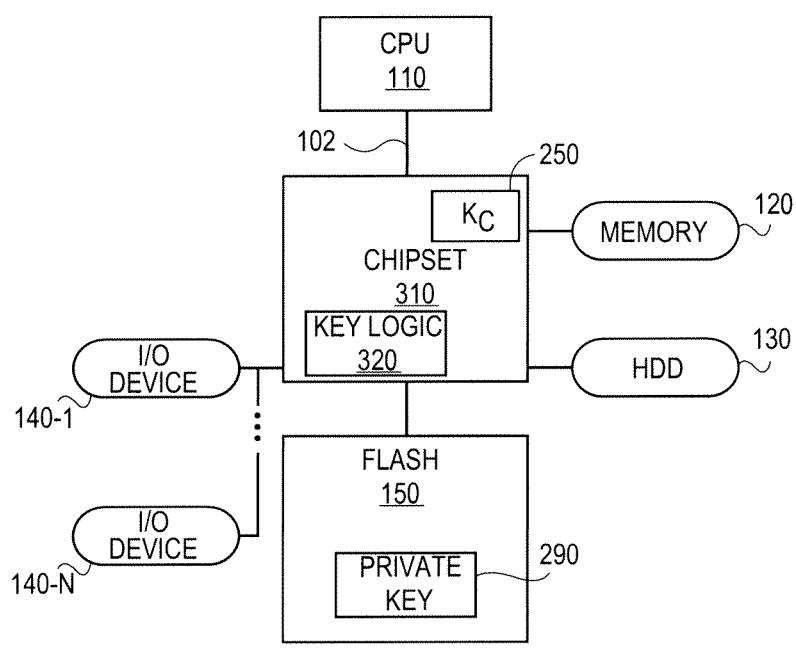
FIG. 1 is a block diagram illustrating a computer system including a chipset having key logic to enable receipt of a private key while storing minimal secret, unique information within the chipset, in accordance with one embodiment.

FIG. 1 is a block diagram illustrating computer system 100 including chipset 310 manufactured to include chip secret key ($K_c$) 250 to enable distribution of a private key to chipset 310 using key logic 320, in accordance with one embodiment. Computer system 100 comprises processor system bus (front side bus (FSB)) 102 for communicating information between processor (CPU) 110 and chipset 310 coupled together via FSB 102. As described herein, the term "chipset" is used to describe, collectively the various devices coupled to CPU 110 to perform desired system functionality.

Chipset 310 is coupled to main memory 120 and non-volatile (e.g., Flash) memory 150. In one embodiment, main memory 120 is volatile memory including, but not limited to, random access memory (RAM), synchronous RAM (SRAM), double data rate (DDR), synchronous dynamic RAM (SDRAM), rambus dynamic RAM (RDRAM), or the like. In addition, hard disk drive devices (HDD) 130, as well as one or more input/output (I/O) devices 140 (140-1, . . . , 140-N) are also coupled to chipset 310. As illustrated, chipset 310 includes store chip secret key 250 and key logic 320, which are further described with reference to FIG. 2.

Figure 2:
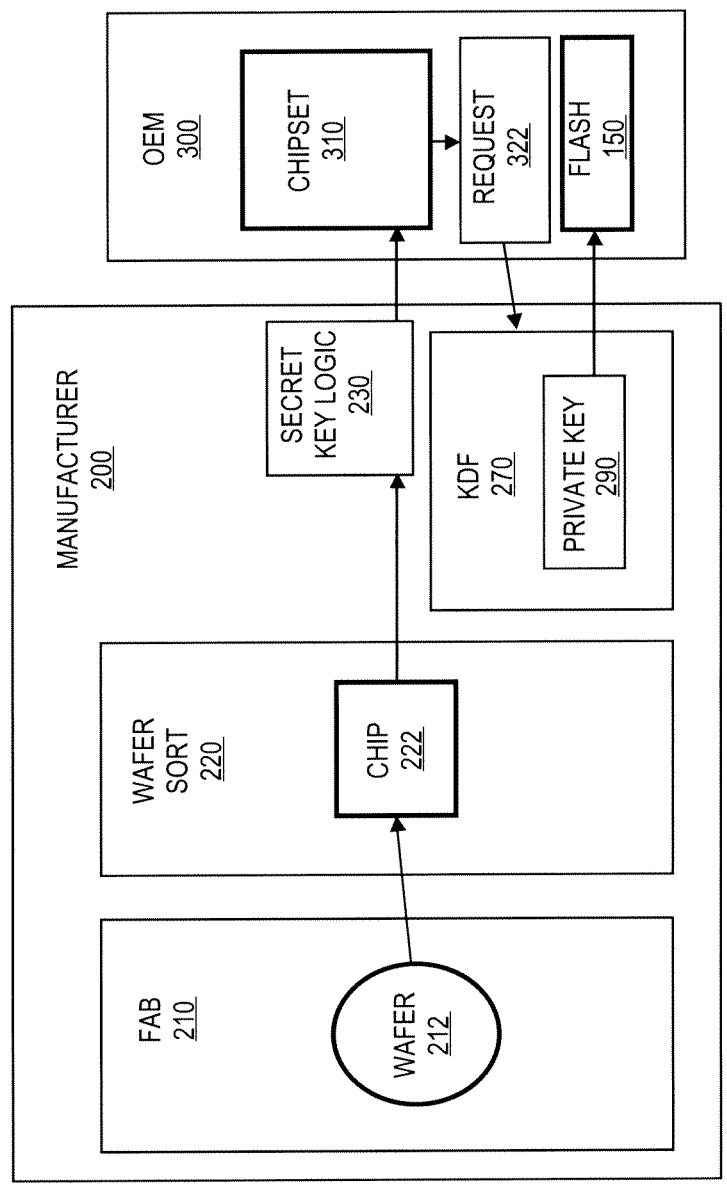
FIG. 2 is a block diagram illustrating an overview of distributing private keys to an entity with minimal secret, unique information, in accordance with one embodiment.

FIG. 2 provides an overview for the installation of chip secret key 250 within chip 222 manufactured by manufacturer 200 and the subsequent generation and assignment of at least one private key 290 to chip 222 once integrated within chipset 310, in accordance with one embodiment. As described herein, chip 222 is may alternatively referred to as manufactured chip 222, and integrated chip 222. In one embodiment, private key 290 is stored within flash memory 150. Representatively, private key 290 enables chip 222 to perform an authentication procedure to establish a secure authenticated channel, in accordance with one embodiment. In one embodiment, a chip secret key 250 enables assignment of at least one public/private key crypto-system key to chip 222.

In one embodiment, the installation of chip secret key 250 within manufactured chip 222 enables public key cryptography. As described herein, a cryptographic system refers to a system that uses two keys; a public key known to everyone, and a private, or secret, key known only to the recipient of digital content. Accordingly, digital content is initially encrypted by transforming the content into an unreadable format referred to as "cipher text" using a recipient's public key. Subsequently, when the encrypted digital content, or cipher text, is received by the recipient, the received content may be decrypted, or deciphered, using a private key of the recipient to form the digital content in the clear format.

However, as will be recognized by those skilled in the art, the embodiments described herein are not limited to public key cryptography or asymmetric encryption, which uses a public key and private key pair, but may be used within systems for symmetric encryption, which uses single secret, or private, key. Hence, the techniques described herein can be modified to function within cryptographic system, such as symmetric key systems that use a single key that both the sender and the recipient have, as well as public key systems that use two public keys; a public key known to everyone and a private key known to only the recipient of encrypted cipher text.

Referring again to FIG. 2, chip manufacturer 200 initially gathers unique manufacturing information ($M_c$) for each chip. As illustrated, chip 222 is formed during wafer sort from fabricated wafer 212. Hence, in one embodiment, manufacturing information from each chip may include a wafer serial number from which chip 222 is formed in addition to a coordinate X,Y location of chip 222 within wafer 212. Once this information is formed, the manufacturing information $M_c$ is provided to secret key logic 230, as further illustrated with reference to FIG. 3.

Figure 3:
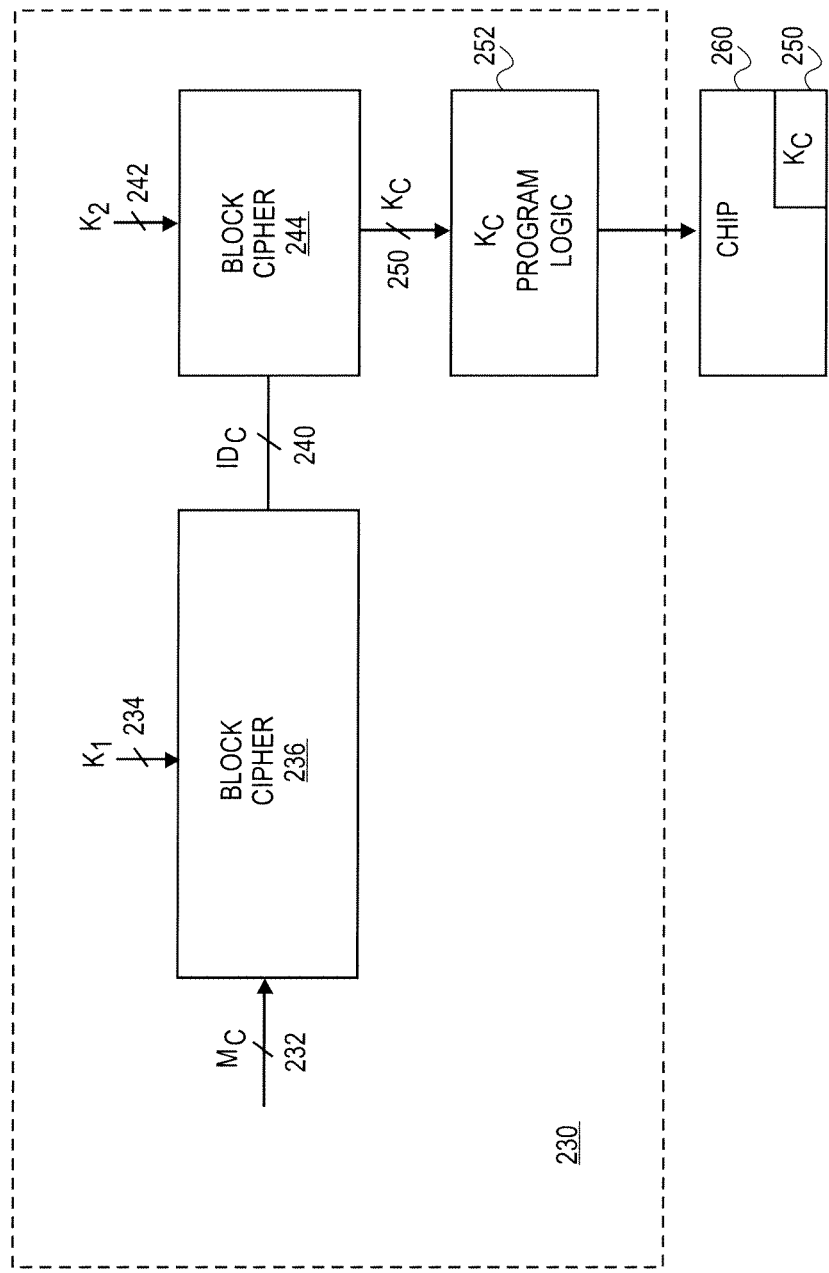
FIG. 3 is a block diagram further illustrating secret key logic of FIG. 2, in accordance with one embodiment.

As illustrated with reference to FIG. 3, manufacturing information $M_c$ 232 is initially provided to first block cipher 236. First block cipher 236 also receives first key ($K_1$) 234. As illustrated, block cipher 236 encrypts $M_c$ 232 to form a unique chip ID ($ID_c$) 240. As further illustrated, chip ID 240 is provided to second block cipher 244, which encrypts $ID_c$ 240 to form chip secret key ($K_c$) 250. Once chip secret key 250 is formed, chip secret key 250 is provided to $K_c$ program logic 252. In one embodiment, program logic 252 installs chip secret key 250 within manufactured chip 222.

In one embodiment, block cipher 236 and block cipher 244 may be implemented using the advanced encryption standard (AES), the triple data encryption standard (3DES), the data encryption standard (DES) or other like encryption/decryption standard. Accordingly, as described herein, the term cryptographic block refers to logic designed to encrypt content or decrypt cipher text according to AES, DES, 3DES or other like encryption/decryption standard.

In one embodiment, chip secret key 250 is installed and programmed into manufactured chip 222 by blowing fuses or equivalent mechanism to store chip set key 250 within manufactured chip 222. Once installed, chip 222 is sent to system OEM 300 for integration. For example, referring again to FIG. 3, secret key logic 230 transmits manufactured chip 222, including chip secret key 250 to OEM 300 for integration within chipset 310. Once installed or integrated within chipset 310, OEM 300 initializes chipset 310 to generate key request 322 using key logic 320 (FIG. 1), as further illustrated with reference to FIG. 4.

Figure 4:
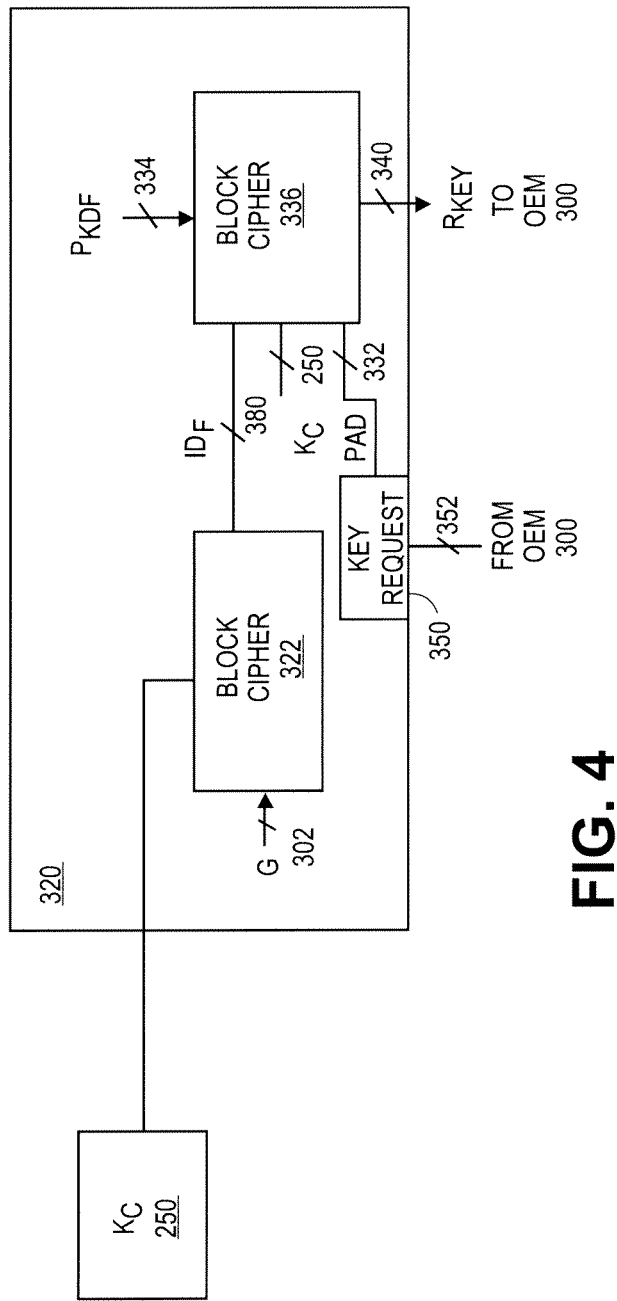
FIG. 4 is a block diagram further illustrating key logic of FIG. 1, in accordance with one embodiment.

As illustrated with reference to FIG. 4, key logic 320 includes a first block cipher 322, which receives cipher text (G) 302 from OEM 300 during initialization of chipset 310. As illustrated, key logic 320 decrypts cipher text G 302 using chip secret key 250 in order to form chip ID 240. However, as part of the initialization process, OEM 300 initially generates random cipher text G 302, which is to include chip ID 240, at least one private key assigned to chipset 310 and a private key digital certificate. However, as part of the initialization process, the initial cipher text merely includes random data in an encrypted format. Accordingly, as part of the initialization process, cryptographic block 322, following decryption of cipher text G 302, produces a random chip ID, a random private key and a random digital certificate.

Subsequently, OEM sends request 352 to key request logic 350. Representatively, key request logic 350 directs block cipher 336 to generate a key update request ($R_{key}$) 340. In one embodiment, key update request 340 is formed by encrypting random chip ID 240, chip secret key 250 and a pad value 332 to preserve privacy. In one embodiment a public key cryptosystem is used to encrypt the information using a public key of a trusted key distribution facility, such as KDF 270 of FIG. 2.

Once the key update request is received by OEM 300, OEM 300 signs random cipher text G 302 with a private key of the OEM ($K_{OEM}$) to produce a digital signature (S(G)). As known to those skilled in the art, a digital signature represents a digital code that can be attached to an electronically transmitted message that uniquely identifies the sender of the message for security purposes. Once signed, OEM sends key request 322, signature S(G) and random cipher text G 302 to KDF 270, as further illustrated with reference to FIG. 5.

Figure 5:
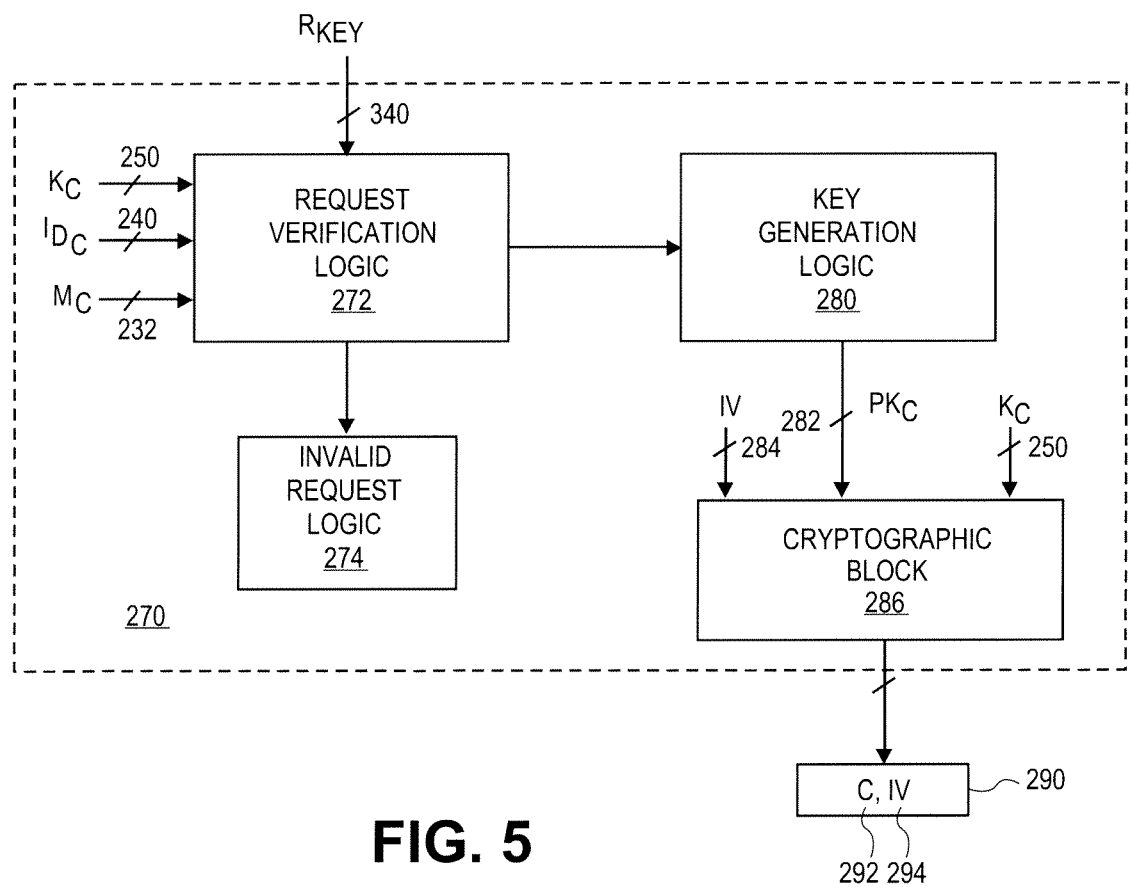
FIG. 5 is a block diagram further illustrating key distribution facility of FIG. 2, in accordance with one embodiment.

As illustrated with reference to FIG. 5, KDF 270 initially verifies S(G) using the OEM's public key ($P_{OEM}$). If the received digital signature is invalid, the request is ignored, otherwise, KDF 270, using request verification logic 272, decrypts chip secret key 250 and random chip ID within key request 322 using a private key of the key distribution facility ($K_{KDF}$). In one embodiment, request verification logic 272 computes chip ID 240 by decrypting chip secret key 250 using key ($K_1$) 234. Subsequently, KDF 270 computes manufacturing information 232 by decrypting chip ID 240 using a cryptographic block and key ($k_1$) 234. Representatively, manufacturer 200 also functions as KDF 270. However, a CA or other like trusted third party may perform the generation and assignment of private key 290.

Accordingly, logic 272 may verify that chip secret key 250 within key request 340 is authentic by decrypting chip secret key 250 to form chip ID 240 to derive decrypted manufacturing information and compare the manufacturing information with the initial or original manufacturing information used to form chip ID 240. If matching information is detected, control flow is provided to key generation logic 280. Otherwise, invalid request logic 274 may invalidate trust in OEM 300 and subsequently suspend trust, pending an investigation of an attempt to obtain keys for false chips.

Assuming the OEM is trusted, key generation logic 280 computes private key ($PK_c$) 282. Subsequently, $PK_c$ 282 is provided to cryptographic block 286. In one embodiment block 286 performs cipher block chaining (CBC mode) encryption using a random number or initialization vector (IV) to produce a message C. As known to those skilled in the art, cipher block chaining (CBC) is a confidential mode whose encryption features the combining (chaining) of the plain text blocks with previous cipher blocks. In one embodiment, the message C or cipher text 292 is comprised of $PK_c$ 282, a digital key certificate and chip ID 240, which are encrypted using chip secret key 250. Once formed, cipher text 292, along with initialization vector 294, are transmitted to OEM 300.

Referring again to FIG. 2, OEM 300 stores cipher text C 292 and initialization vector 292 within off-chip persistent memory of the system. Representatively, the off-chip persistent memory is flash memory. Once the cipher text 292 and IV 294 are stored, OEM reinitializes chipset 310 by providing chipset 310 with cipher text 292 during, for example, initial system boot. Once received, key logic 320 once again decrypts cipher text C in order to form chip ID 240, a digital key certificate and the at least one private key. In one embodiment, the digital key certificate is used by chipset 310 during an authentication procedure to establish a secure authenticated channel, without disclosing the identity of chipset 310 (in those embodiments where each chip receives a unique sequence of non-unique keys, or uses an authentication protocol that does not establish identity).

As known to those skilled in the art, a digital certificate represents an attachment to an electronic message used for security purposes. Accordingly, an individual wishing to send an encrypted message applies for a digital certificate from a certificate authority (CA). As described herein, a CA is a trusted third-party organization or company that issues digital certificates used to create digital signature and public-private key pairs. Hence, attachment of a digital certificate to an encrypted message enables a recipient of the encrypted message, or cipher text, to verify that the sender of the cipher text is an authenticated, or trusted, individual. Procedural methods for implementing one or more of the above-mentioned embodiments are now described.

Operation

Figure 6:
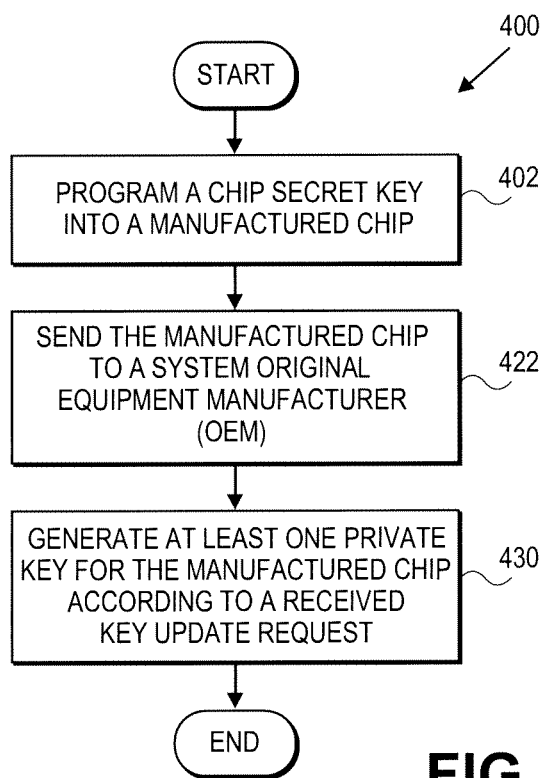
FIG. 6 is a flowchart illustrating a method for installing minimal secret, unique information within a manufactured chip to enable distribution of at least one private key to the manufactured chip, in accordance with one embodiment.

FIG. 6 is a flowchart illustrating a method 400 for installing a chip secret key within a manufactured chip to enable the manufactured chip to receive at least one assigned private key to enable the manufactured chip to perform an authentication procedure to establish a secure authenticated channel, in accordance with one embodiment. At process block 402, a chip secret key is programmed into a manufactured chip. At process block 422, the manufactured chip is sent to an original equipment manufacturer (OEM). Subsequently, at process block 430, at least one private key is generated for the manufactured chip according to a received key update request. In one embodiment, method 400 approximately describes private key distribution, as illustrated with reference to FIGS. 2-5.

Figure 7:
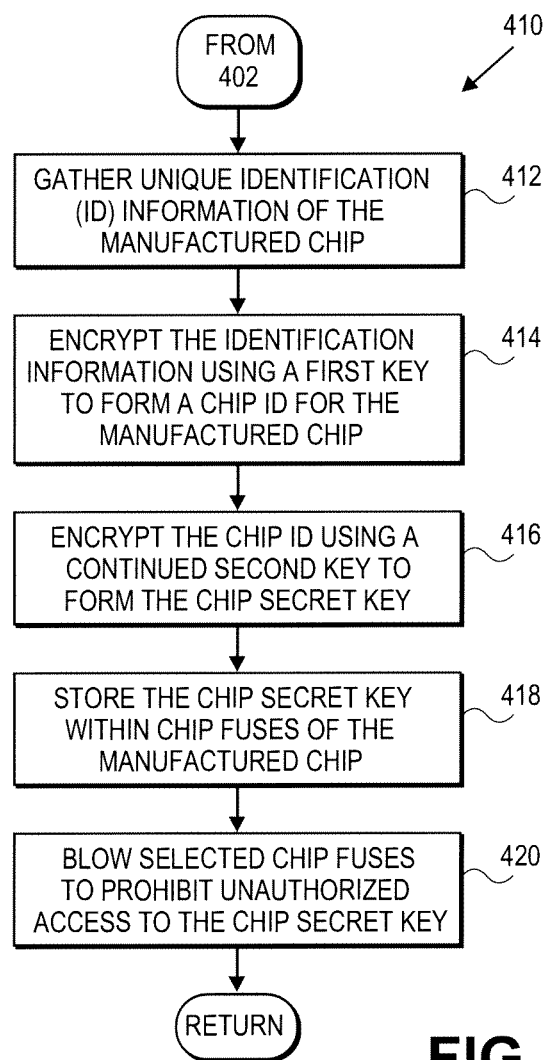
FIG. 7 is a flowchart illustrating a method for installing minimal secret, unique information within a manufactured chip, in accordance with one embodiment.

FIG. 7 is a flowchart illustrating a method 410 for programming the chip secret key into a manufactured chip, in accordance with one embodiment. At process block 412, unique identification (ID) information is gathered for the manufactured chip. In one embodiment, the identification information includes a wafer serial number of a wafer from which the manufactured chip is formed, as well as an X,Y coordinate location of the manufactured chip within the wafer. However, those skilled in the art will recognize that identification information may be generated from a wide array of sources in order to uniquely identify the manufactured chip.

At process block 414, the identification information is encrypted using a first key to form a chip ID for the manufactured chip, for example, as illustrated with reference to FIG. 3, which depicts secret key logic 230 of manufacturer 200 of FIG. 2, in accordance with one embodiment. At process block 416, the chip ID is encrypted using a second key to form the chip secret key. Once formed, at process block 418, the chip secret key is stored within fuses of the manufactured chip. Once stored, at process block 420, selected chip fuses of the manufactured chip are blown in order to prohibit reading of the chip fuses to disclose the chip secret key.

Figure 8:
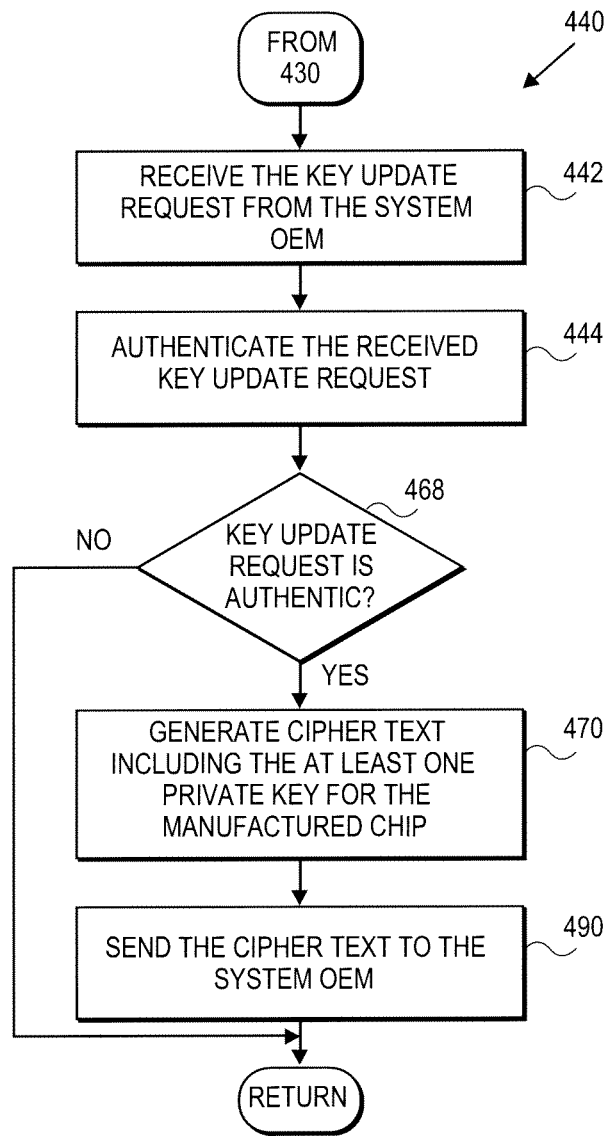
FIG. 8 is a flowchart illustrating a method for generating a private key in response to a key update request, in accordance with one embodiment.

FIG. 8 is a flowchart illustrating a method 440 for generating the at least one private key of process block 430, in accordance with one embodiment. At process block 442, a key update request is received from the system OEM. Once received, at process block 444, the key update request is authenticated. At process block 468, if the key update request is authentic, process block 470 is performed. Otherwise, the key update request is disregarded and trust of the OEM is temporarily suspended, pending an investigation. At process block 470, cipher text including the at least one private key assigned to the manufactured chip is generated. Once generated, at process block 490, the cipher text is sent to the system OEM.

Figure 9:
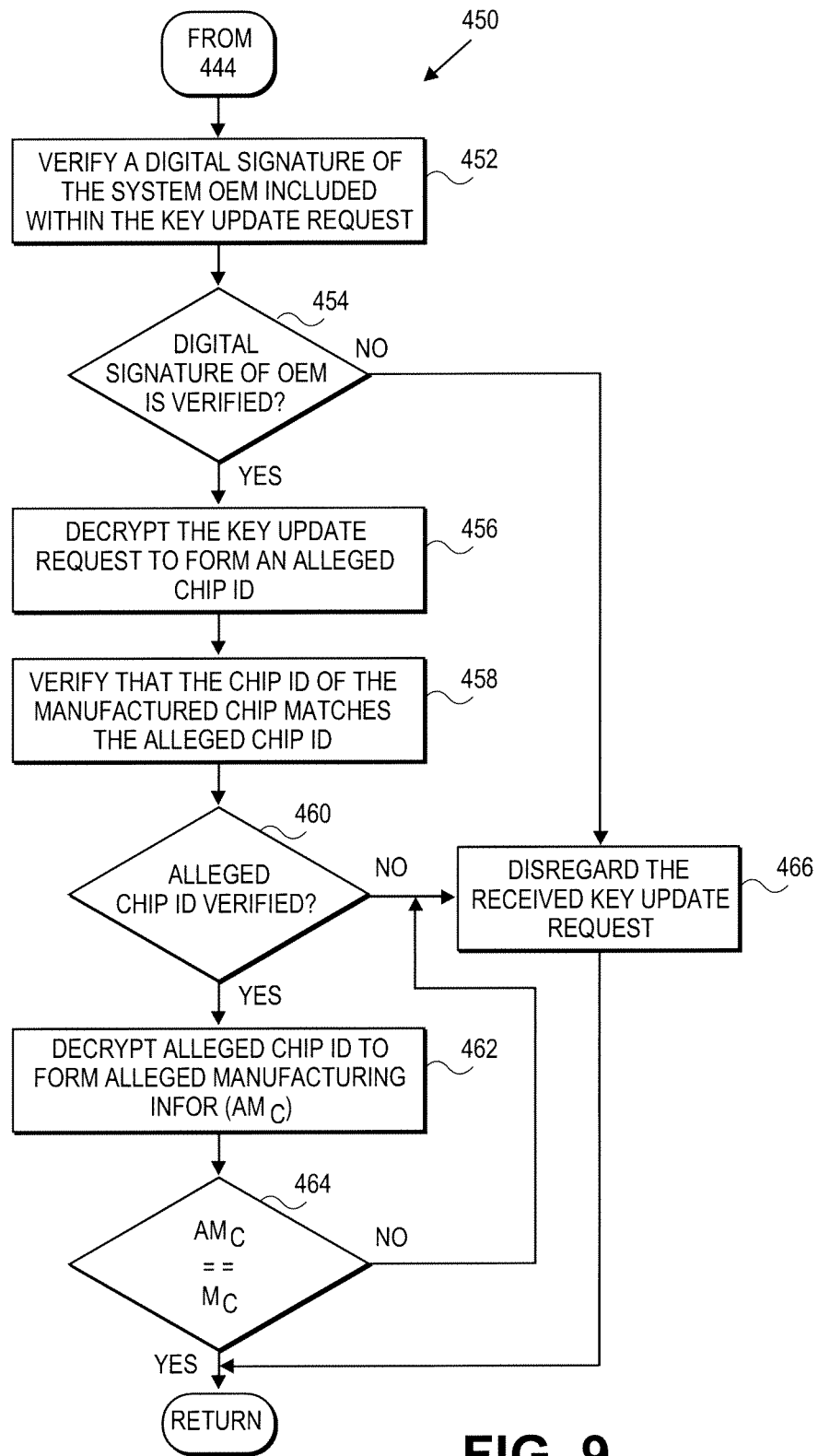
FIG. 9 is a flowchart illustrating a method for authenticating a received key update request, in accordance with one embodiment.

FIG. 9 is a flowchart illustrating a method 450 for authenticating the received key update request of process block 444 of FIG. 8, in accordance with one embodiment. At process block 452, a digital signature of the system OEM included within the key update request is verified. At process block 454, if the digital signature of the OEM is verified, process block 456 is performed. Otherwise, the key update request is ignored. At process block 456, the key update request is decrypted to form an alleged chip ID. At process block 458, the chip ID of the manufactured chip is compared to the alleged chip ID to verify that the chip ID matches the alleged chip ID. At process block 460, if the alleged chip ID is verified, process block 462 is performed. Otherwise, at process block 466, the received key update request is disregarded. At process block 462, the alleged chip ID is decrypted in order to form alleged chip manufacturing information ($AM_c$).

Referring again to FIG. 3, decryption of alleged chip ID ($AID_C$) using key $K_1$ 234 should yield manufacturing information $M_c$ 232. Accordingly, at process block 264, the alleged manufacturing information $AM_c$ is compared to chip manufacturing information $M_c$. Accordingly when $M_c$ is equal to $AM_c$, verification of the received key update request is complete. Once the key update request is verified, control flow returns to process block 444 of FIG. 8. Otherwise, at process block 466, the key update request is disregarded.

FIG. 10 is a flowchart illustrating a method 470 for generating the cipher text, including the at least one private key of process block 460, in accordance with one embodiment. At process block 482, a unique secret value is encrypted using the chip secret key to form a key vector. In one embodiment, the key vector includes a unique series of non-unique public/private key crypto-system keys. Hence, by using a unique series of non-unique keys, the series of keys assigned to a comprised devise can be revoked without interrupting innocent devices. For such innocent devices, such devices will continue performing authentication using the first non-revoked key in their series to continue operation. The use of non-unique keys for authentication preserves the privacy of the manufactured chip.

Accordingly, in one embodiment, the initial installation of the chip secret key enables insulation of an order of magnitude more keys that would normally be used by a conventional crypto-system using less unique bits in the chip than are required to install even one asymmetric private key pair. Referring again to FIG. 10, at process block 484, all revoked keys from the key vector are removed to form a private key vector. At process block 486, the private key vector, the chip ID and digital certificates corresponding to the vector of private keys are encrypted using the chip secret key and an initialization vector to form the cipher text. Accordingly, in some embodiments, a first non-revoked private key and its corresponding digital certificate are used to form the cipher text instead of the private key vector and corresponding digital certificates.

Referring now to FIG. 11, FIG. 11 is a flowchart illustrating a method 500 for initializing an integrated chip, including a preprogrammed chip secret key to generate a key update request in order to receive an assigned, at least one private key from a key distribution facility (KDF). At process block 502, an integrated chip within a system is initialized to generate a key update request using a preprogrammed chip secret key stored within the integrated chip. At process block 530, the key update request is transmitted to a key distribution facility.

Once transmitted, the key distribution facility will generate cipher text including at least one private key assigned to the integrated chip from the KDF. Subsequently, the integrated chip may use the private key to send a received encrypted digital content in the form of cipher text, which may be decrypted using a private key of the integrated chip once received. Accordingly, by using the assigned private key, the integrated chip is capable of forming a secure authenticated channel in order to receive protected content from content protection applications.

Figure 12:
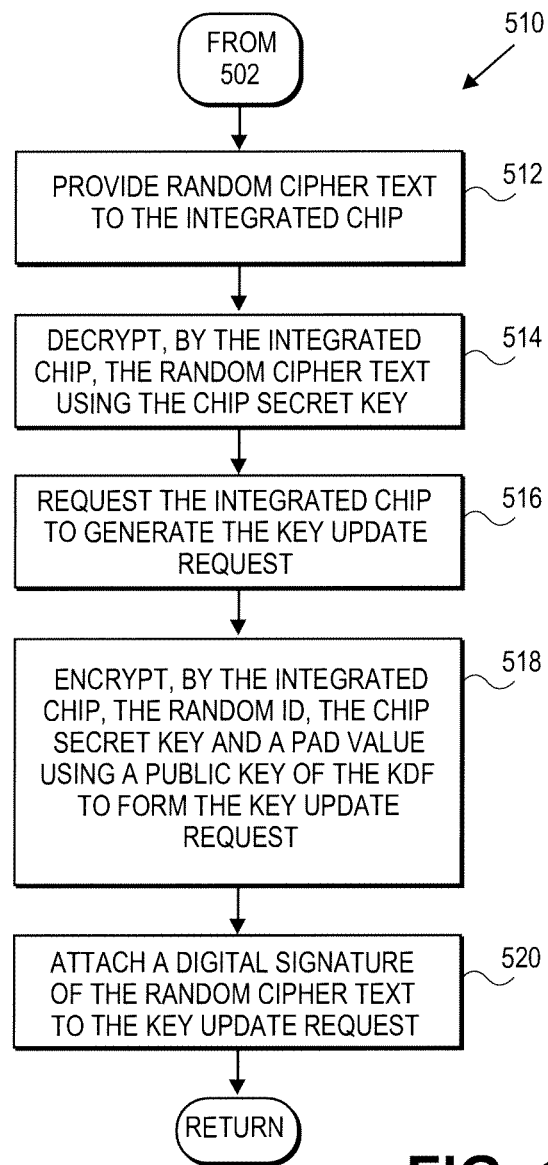
FIG. 12 is a flowchart illustrating a method for initializing an integrated chip having minimal unique, secret information, in accordance with one embodiment.

FIG. 12 is a flowchart illustrating a method 510 for initializing the integrated chip of process block 502 of FIG. 11, in accordance with one embodiment. At process block 512, random cipher text is provided to the integrated chip. At process block 514, the integrated chip decrypts the random cipher text using the chip secret key to form a random ID, a random key and a random digital certificate. At process block 516, the OEM requests the integrated chip to generate the key update request. In response, at process block 518, the integrated chip encrypts the random ID, the chip secret key and a pad value using a public key of the KDF to form the key update request. At process block 520, the OEM attaches a digital certificate of the OEM and a signature of the random cipher text used in step 512 to the random cipher text.

Figure 13:
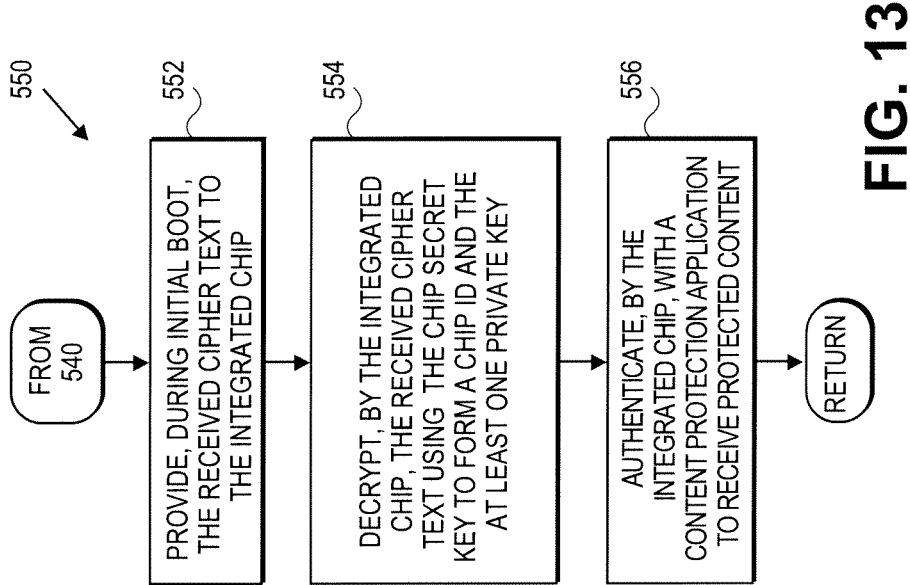
FIG. 13 is a flowchart illustrating a method for initializing an integrated chip having stored minimal secret, unique information to perform authentication using at least one private key assigned to the integrated chip, in accordance with one embodiment.

FIG. 13 is a flowchart illustrating a method 550 for initializing an integrated chip once an assigned at least one private key is received for the integrated chip, in accordance with one embodiment. At process block 552, received cipher text is provided to the integrated chip during initial boot. Once provided to the chip, the integrated chip decrypts the received cipher text using the chip secret key to form a chip ID and the at least one private key. Subsequently, at process block 556, the integrated chip authenticates with a content protection application to receive protected content. In one embodiment, during authentication, the integrated chip also provides a received digital key certificate during the authentication protocol.

Representatively, since the digital key certificate associated with, for example, a key vector, may be shared by many platforms, the digital certificate cannot be used as a platform identity. Hence, content protection applications cannot identify the recipient of content. As such, content protection applications are able to verify that the integrated chip is an authorized recipient using the private key digital certificate. Hence, privacy is maintained by using the private key digital certificate during authentication protocols. In one embodiment, privacy is best preserved if access to received cipher text is limited to access during initial boot. Subsequently, following initial boot, access to received cipher text, including the at least one private key assigned to the chip, is disabled. However, if access to the received cipher text may not be disabled following initial boot, the integrated chip may be further requested to generate a second key update request.

Figure 14:
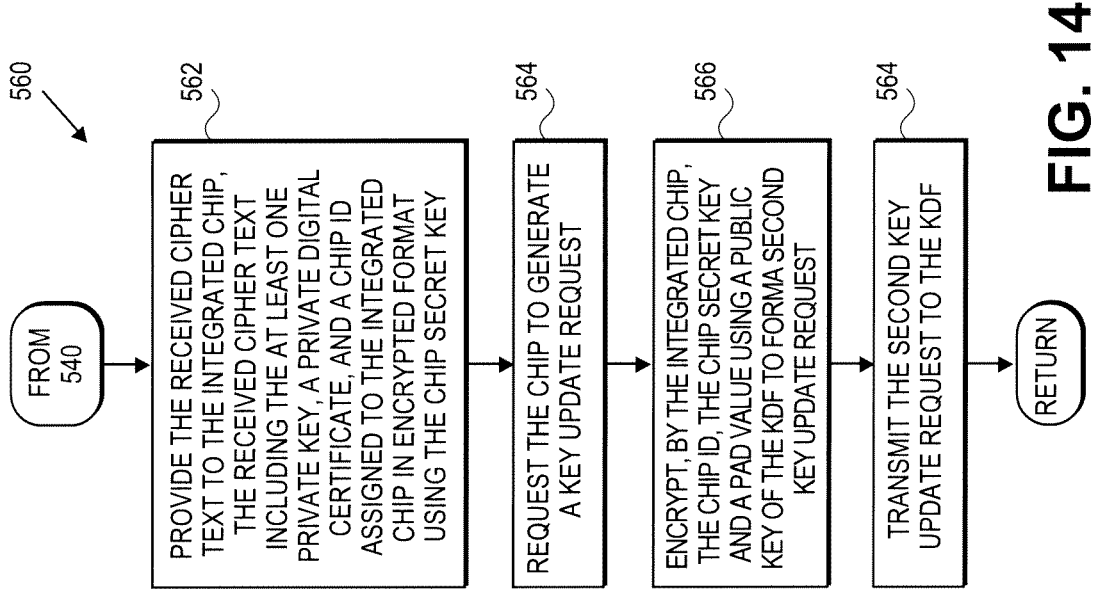
FIG. 14 is a flowchart illustrating a method for requesting an integrated chip having stored minimal unique, secret information to perform a key update request, in accordance with one embodiment.

Referring to FIG. 14, FIG. 14 is a flowchart illustrating a method 560 for generating a second key update request, in accordance with one embodiment. At process block 560, the received cipher text is provided to the integrated chip. Subsequently, the integrated chip is requested to generate a key update request. At process block 566, the integrated chip encrypts the chip ID, the chip secret key and a pad value using a public key of the KDF to form a second key update request. At process block 568, the second key update request is transmitted to the KDF.

As such, the KDF will generate a new private key for the integrated chip to enable integrated chip to use the private key for future authentication with content protection applications. Accordingly, the process of replacing the initially assigned at least one private key to the integrated chip may be repeated as desired. Furthermore, this process may be repeated in order to preserve privacy of the integrated chip from applications that may be able to access the received cipher text after device initialization or initial system boot.

Accordingly, conventional systems generally install a unique asymmetric crypto-system private key within a device. Unfortunately, such private keys take more space (bits) than a symmetric secret key, which is a cost problem for integrated chips since the space required to store such asymmetric or symmetric keys is costly. Furthermore, once a device authenticates with a content protection application, user privacy is generally violated since the identity of the device is made known to the authentication application. Accordingly, by using multiple, non-unique public/private key pairs to provide privacy, implementation of such a scheme would require significantly more space to store multiple keys.

Accordingly, in one embodiment, the chip secret key enables the minimum possible number of fuse bits, such as enough to prevent a hacker from attacking the compromised device by merely guessing the information, but less information than required to store a secret key of a public/private key pair. Hence, in one embodiment, the device receives an arbitrary number of keys within a key vector. Subsequently, an identify of the device is only revealed to a trusted party that distributes keys to legitimate devices during system initialization. Hence, an identity of the device is not revealed during normal use or authentication to receive protected content.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   programming a chip secret key into a manufactured chip;
   sending the manufactured chip to a system original equipment manufacturer (OEM); and
   generating at least one private key for the manufactured chip in response to a received key update request, wherein generating the at least one private key comprises:
   generating cipher text including the at least one private key using an initialization vector (IV) by generating a key vector including the at least one private key; and
   sending the cipher text to the system OEM including the IV used to form the cipher text; and
   authenticating the received key update request, wherein authenticating the received key update request comprises:
   verifying a digital signature of the system OEM included within the key update request; decrypting the key update request to form a decrypted chip ID if the digital signature of the OEM is verified; verifying that a chip ID of the manufactured chip matches the decrypted chip ID; and disregarding the received key update request if the decrypted chip ID is not verified.

2. The method of claim 1, wherein prior to programming the chip, the method comprises:
   gathering unique identification (ID) information of the manufactured chip;
   encrypting the identification information using a first key to form a chip ID for the manufactured chip; and
   encrypting the chip ID using a second key to form a chip secret key.

3. The method of claim 2, wherein the unique identification information includes a wafer serial number of a wafer from which the chip is formed and an X,Y coordinate location of the manufactured chip within the wafer.

4. The method of claim 1, wherein a key size of the chip secret key is less than a key size of an asymmetric cryptosystem private key.

5. The method of claim 1, wherein programming the chip secret key comprises:
   storing the chip secret key within chip fuses of the manufactured chip; and
   blowing selected fuses of the manufactured chip to prevent unauthorized access to the chip secret key.

6. The method of claim 1, wherein generating the key vector comprises: encrypting a unique secret value using the chip secret key to form the key vector;
   removing all revoked keys from the key vector to form a private key vector; and
   encrypting the private key vector, the chip ID and a digital certificate of the private key vector using the chip secret key and an initialization vector to form the cipher text.

7. The method of claim 1, wherein the key update request is issued by the manufactured chip in response to chip initialization.

8. An article of manufacture including a non-transitory machine readable medium having stored thereon instructions which may be used to program a system to perform a method, comprising:
   programming a chip secret key into a manufactured chip;
   sending the manufactured chip to a system original equipment manufacturer (OEM); and
   generating at least one private key for the manufactured chip in response to a received key update request, wherein the key update request is issued by the manufactured chip in response to chip initialization, and further wherein generating the at least one private key comprises:
   generating cipher text including the at least one private key using an initialization vector (IV); and
   sending the cipher text to the system OEM including the IV used to form the cipher text; and
   authenticating the received key update request, wherein authenticating the received key update request comprises:
   verifying a digital signature of the system OEM included within the key update request; decrypting the key update request to form a decrypted chip ID if the digital signature of the OEM is verified; verifying that a chip ID of the manufactured chip matches the decrypted chip ID; and disregarding the received key update request if the decrypted chip ID is not verified.

9. The article of manufacture of claim 8, wherein prior to programming the chip, the method comprises:
   gathering unique identification (ID) information of the manufactured chip;
   encrypting the identification information using a first key to form a chip ID for the manufactured chip; and
   encrypting the chip ID using a second key to form the chip secret key.

10. An article of manufacture including a non-transitory computer readable storage medium having stored thereon instructions which may be used to program a system to perform a method, comprising:
   initializing an integrated chip to generate a key update request using a preprogrammed chip secret key stored within the integrated chip, wherein initializing the integrated chip comprises:
      providing random cipher text to the integrated chip;
      requesting the integrated chip to generate the key update request, by:
         decrypting, by the integrated chip, the random cipher text using the chip secret key to form a random ID, a random key and a random digital certificate; and
         encrypting, by the integrated chip, the random ID, the chip secret key and a pad value using a public key of the KDF to form the key update request; and
      attaching a digital signature of the random cipher text to the key update request;
   transmitting the key update request to a key distribution facility (KDF); and
   storing received cipher text including at least one private key from the KDF.

11. The article of manufacture of claim 10, further comprising:
   providing, during initial boot, the received cipher text to the integrated chip; and
   decrypting, by the integrated chip, the received cipher text using the chip secret key to form a chip ID and the at least one private key; and
   authenticating, by the integrated chip, with a content protection application to receive protected content.

12. The article of manufacture of claim 10, wherein the method further comprises:
   providing the received cipher text to the integrated chip, the cipher text including the at least one private key, a key certificate and a chip ID assigned to the integrated chip in encrypted format using the chip secret key;
   requesting the integrated chip to generate a key update request;
   encrypting, by the integrated chip, the chip ID, the chip secret key and a random pad value using a public key of the KDF to form a second key update request; and
   transmitting the second key update request to the KDF.

13. A method comprising:
   initializing an integrated chip within a system to generate a key update request using a preprogrammed chip secret key stored within the integrated chip, wherein initializing the integrated chip comprises:
      providing, during initial boot, random cipher text to the integrated chip;
      requesting the integrated chip to generate the key update request; and
         decrypting, by the integrated chip, the received cipher text using the chip secret key to form a chip ID and the at least one private key; and
      authenticating, by the integrated chip, with a content protection application to receive protected content
      attaching a digital signature of the random cipher text to the key update request;
   transmitting the key update request to a key distribution facility (KDF); and
   storing received cipher text including at least one private key from the KDF.

14. The method of claim 13, wherein requesting the integrated chip further comprises:
   decrypting, by the integrated chip, the random cipher text using the chip secret key to form a random ID, a random key and a random digital certificate; and
   encrypting, by the integrated chip, the random ID, the chip secret key and a pad value using a public key of the KDF to form the key update request.

15. The method of claim 13, wherein storing the received cipher text comprises:
   receiving an initialization vector (IV) with the received cipher text from the KDF; and
   saving the received cipher text and the IV within off-chip persistent storage.

16. The method of claim 13, wherein authenticating further comprises:
   using, by the integrated chip, a private key digital certificate to authenticate with the content protection application.

17. The method of claim 13, wherein providing further comprises:
   disabling access to the received cipher text following the initial boot.

18. The method of claim 13, wherein the KDF is a manufacturer of the chip.

19. The method of claim 13, further comprising:
   providing the received cipher text to the integrated chip, the received cipher text including the at least one private key, a private key digital certificate and a chip ID assigned to the integrated chip in encrypted format using the chip secret key;
   requesting the chip to generate a key update request;
   encrypting, by the integrated chip, the chip ID, the chip secret key and a pad value using a public key of the KDF to form a second key update request; and
   transmitting the second key update request to the KDF.

20. The method of claim 19, wherein the received cipher text includes a key vector including a series of non-unique private keys.

* * * * *